(12) United States Patent
Freitag et al.

(10) Patent No.: US 10,041,726 B2
(45) Date of Patent: Aug. 7, 2018

(54) VACUUM INSULATION BODY

(71) Applicants: Liebherr-Hausgeräte Lienz GmbH, Lienz (AT); Liebherr-Hausgeräte Ochsenhausen GmbH, Ochsenhausen (DE)

(72) Inventors: Michael Freitag, Würzburg (DE); Martin Kerstner, Würzburg (DE); Jochen Hiemeyer, Karlstadt (DE)

(73) Assignees: Liebherr-Hausgeräte Lienz GmbH, Lienz (AT); Liebherr-Hausgeräte Ochsenhausen GmbH, Ochsenhausen (DE)

(*) Notice: Subject to any disclaimer, the term of this patent is extended or adjusted under 35 U.S.C. 154(b) by 0 days.

(21) Appl. No.: 15/730,084

(22) Filed: Oct. 11, 2017

(65) Prior Publication Data

US 2018/0031305 A1 Feb. 1, 2018

Related U.S. Application Data

(63) Continuation of application No. 14/766,318, filed as application No. PCT/EP2014/000122 on Jan. 17, 2014.

(30) Foreign Application Priority Data

Feb. 7, 2013 (DE) .......... 10 2013 002 312

(51) Int. Cl.
  *F25D 23/06* (2006.01)
  *B29C 65/72* (2006.01)
  *B29L 31/26* (2006.01)

(52) U.S. Cl.
  CPC ............ *F25D 23/065* (2013.01); *B29C 65/72* (2013.01); *B29L 2031/265* (2013.01); *F25D 2201/14* (2013.01)

(58) Field of Classification Search
  CPC ... F25D 23/065; F25D 2201/14; B29C 65/72; B29L 2031/265
  See application file for complete search history.

(56) References Cited

U.S. PATENT DOCUMENTS

| 970,095 | A | | 9/1910 | McPheeters |
| 1,898,977 | A | | 2/1933 | Comstock |
| 2,345,792 | A | * | 4/1944 | Cann ................... H01M 2/1072 174/153 R |
| 2,687,158 | A | | 8/1954 | Owen |
| 3,151,905 | A | * | 10/1964 | Reuther ................ B60R 16/00 174/152 G |

(Continued)

FOREIGN PATENT DOCUMENTS

| CN | 1276050 A | 12/2000 |
| CN | 1342255 A | 3/2002 |

(Continued)

*Primary Examiner* — Emmanuel Duke
(74) *Attorney, Agent, or Firm* — Dilworth & Barrese, LLP

(57) ABSTRACT

The present invention relates to a vacuum insulation body with a vacuum-tight envelope, wherein through the region surrounded by the envelope at least one lead-through extends, which surrounds a free space, and/or wherein at least one port extends from the envelope. According to the invention, the lead-through and/or the port likewise is formed vacuum-tight and vacuum-tightly connected with the envelope.

11 Claims, 2 Drawing Sheets

(56) References Cited

U.S. PATENT DOCUMENTS

| | | | | |
|---|---|---|---|---|
| 3,619,482 | A | * | 11/1971 | Boor .................. H01B 17/303 16/2.2 |
| 4,097,096 | A | * | 6/1978 | Kochendorfer ......... F25D 21/04 174/153 G |
| 4,180,297 | A | * | 12/1979 | Abrams ................ F25D 23/065 16/2.2 |
| 4,186,945 | A | * | 2/1980 | Hahn ...................... F16L 5/022 174/153 G |
| 4,715,512 | A | * | 12/1987 | Buchser ............... F25D 23/064 220/592.1 |
| 4,805,293 | A | * | 2/1989 | Buchser ............... F25D 23/064 264/46.6 |
| 5,273,801 | A | | 12/1993 | Barry et al. |
| 5,512,345 | A | | 4/1996 | Tsutsumi et al. |
| 5,551,590 | A | | 9/1996 | Mazur et al. |
| 5,941,619 | A | * | 8/1999 | Stieben ............... E05D 11/0081 16/223 |
| 6,224,179 | B1 | | 5/2001 | Wenning et al. |
| 7,641,298 | B2 | * | 1/2010 | Hirath .................... F24C 15/08 312/401 |
| 8,202,599 | B2 | * | 6/2012 | Henn ..................... E04B 1/803 428/69 |
| 2009/0324871 | A1 | | 12/2009 | Henn |

FOREIGN PATENT DOCUMENTS

| | | |
|---|---|---|
| CN | 102102796 A | 6/2011 |
| DE | 197 45 860 A1 | 6/1999 |
| DE | 20 2006 012 469 U1 | 10/2007 |
| DE | 10 2006 039621 A1 | 2/2008 |
| GB | 430123 A | 6/1935 |
| JP | H08-312680 A | 11/1996 |
| WO | 99/20961 A1 | 4/1999 |
| WO | 01/39570 A1 | 6/2001 |
| WO | 2004/010042 A1 | 1/2004 |

\* cited by examiner

VACUUM INSULATION BODY

BACKGROUND OF THE INVENTION

The present invention relates to a vacuum insulation body with a vacuum-tight envelope.

From the prior art it is known that for example in refrigerators and/or freezers the wall which surrounds the cooled interior space is formed as vacuum insulation body. Such insulation body usually consists of an envelope, which must be designed diffusion-tight, and a supporting material, such as a bulk material, which provides the vacuum insulation body with the required mechanical stability.

This vacuum insulation body can completely surround the cooled interior space, apart from its open side to be closed by a door or the like, so that the problem arises that lines required for operation of the appliance, such as refrigerant lines or electric lines which must be guided to the inner container, possibly must be introduced into the interior space past the vacuum insulation body, which involves certain disadvantages. Apart from this, a reliable possibility for evacuating the vacuum insulation body during the manufacture of the appliance must be created.

SUMMARY OF THE INVENTION

Therefore, it is the object underlying the present invention to develop a vacuum insulation body as mentioned above to the effect that installing lines, tubes and the like and/or generating a vacuum in the vacuum insulation body is possible easily and reliably.

This object is solved by a vacuum insulation body with the features herein.

Accordingly, it is provided that through the region surrounded by the envelope at least one lead-through extends, which surrounds a free space. Alternatively or in addition, it can be provided that at least one port extends from the envelope, which is arranged on the envelope such that the same can be evacuated. The lead-through or the port likewise are formed vacuum-tight and are vacuum-tightly connected with the envelope.

Thus, it is the idea underlying the design of the vacuum insulation body according to the invention to manufacture at least one aperture through the envelope of the vacuum insulation body itself, so that a cable or tube or the like can be guided from one side of the envelope to the other side of the envelope, without the useful life of the envelope being impaired.

This aperture or lead-through in turn is designed vacuum-tight and likewise vacuum-tightly connected with the envelope of the vacuum insulation body. Thus, it is possible to design the vacuum-tight envelope with a long useful life despite the lead-through or the port, as in the region of the lead-through or the port an ingress or air or gas is prevented.

The invention is not limited to such lead-through, but also covers a port which likewise is connected with the envelope in a vacuum-tight or diffusion-tight manner and through which air can be withdrawn from the envelope for the purpose of generating a vacuum.

This port in turn also is formed vacuum-tight.

What can be considered, for example, is the use of a film, preferably a high-barrier film, for the envelope and/or for the lead-through and/or for said port.

The use of a film has the advantage that the lead-through or the port are designed flexible, so that adaptations to the positioning of the elements to be led through, such as for example cables, tubes, etc., possibly can be made.

Preferably, it is provided that the lead-through and/or the port are formed tubular.

The lead-through and/or the port partly or completely can be made of a high-barrier film. This can apply correspondingly for the vacuum-tight envelope. What is conceivable is a metal-coated plastic film.

Preferably, it is provided that the lead-through and/or the port are made of a material which can be sealed thermally, namely such that after thermal sealing a vacuum-tight connection with the envelope is present.

Such thermal sealing also can be considered, for example, when after the evacuation operation the port is to be sealed, so that the vacuum in the envelope is preserved.

When the port is to be reused again, the sealed portion can be cut off and an evacuation operation can be performed again, in case this is necessary.

Instead or in addition to thermal sealings an adhesive connection also is conceivable and comprised by the invention.

In accordance with a further aspect of the invention it is provided that the vacuum-tight connection between the lead-through and/or the port and the envelope is made by thermal sealing, as stated above. It is conceivable to produce this thermal sealing by applying a pressing force which is produced by a molding compound in the form of a clamp, which will yet be described in detail below. Instead or in addition to thermal sealing an adhesive bond also is conceivable, as stated above.

As explained above, the lead-through and/or the port and/or the envelope can be made of a film. What is useful, for example, is a metal-coated film, in particular plastic film, such as e.g. an aluminum-coated PE film.

In a further aspect of the invention it is provided that one or more elements extend through the lead-through and are tightly enclosed by the lead-through. For example, this can be achieved in that the lead-through is sucked against these elements, so that the same tightly fits correspondingly. Alternatively or in addition it is conceivable that the lead-through is glued or in some other way connected to the elements led through.

These measures for attaching the lead-through preferably are carried out before generating the vacuum in the envelope.

The present invention furthermore relates to a refrigerator and/or freezer with at least one cooled interior space and with at least one wall at least partly surrounding the cooled interior space, wherein the wall partly or completely is formed by at least one vacuum insulation body according to the description herein. The vacuum insulation body thus partly or completely forms the appliance body.

The invention furthermore relates to a molding compound for producing a vacuum-tight connection between the lead-through and/or the port and the envelope of a vacuum insulation body according to the description herein, comprising at least one clamp, wherein the clamp is arranged such that it exerts a pressing force on the envelope and on the lead-through and/or on the port, so that the material of the envelope and the material of the lead-through or the port is thermally sealed due to the pressing force.

Due to its pressing force exerted on the material structure, this molding compound effects a thermal sealing of the materials, preferably of the film compound or film structure, and in addition allows a relief of tension at the final appliance, such as at the refrigerator and/or freezer. Thermal sealing represents a vacuum-tight connection between the two connected films.

Furthermore, it can be provided that the molding compound includes at least two jaws movable relative to each other, between which the materials to be compressed or the compressed materials are accommodated.

It can preferably be provided that the jaws can be fixed relative to each other preferably by a latching connection.

It is conceivable to press the two jaws together, wherein the pressing position is held for example by a latching connection. The pressing force can be produced for example pneumatically, hydraulically or also mechanically, e.g. by a screw connection.

In a further aspect of the invention it is provided that the molding compound includes at least one portion which forms the inner wall of an aperture into the lead-through or into the envelope. It is conceivable, for example, that the molding compound includes a tubular portion which forms the inner walls of an aperture which leads into the lead-through from outside or from the port into the envelope. Proceeding from this tubular portion, said jaws form flange-like portions which are formed all around.

Furthermore, it is conceivable that the molding compound is made of metal and preferably of aluminum.

BRIEF DESCRIPTION OF THE DRAWINGS

Further details and advantages of the invention will be explained in detail with reference to an exemplary embodiment illustrated in the drawing, in which.

DESCRIPTION OF THE PREFERRED EMBODIMENTS

Figure 1:
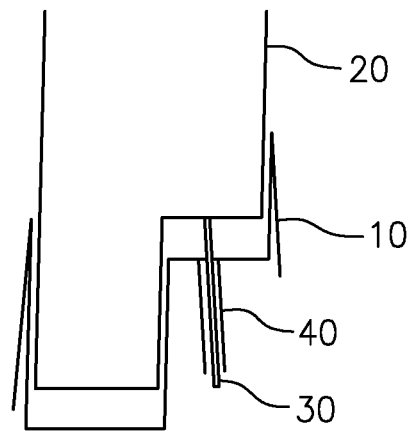
FIG. 1: shows a schematic view of a part of an envelope of a vacuum insulation body according to the present invention with an inner container.

Referring to the drawings, in FIG. 1 the inner liner of the refrigerator is denoted with reference numeral 20 and the inner high-barrier film (not yet attached to the outside of the inner liner 20) is denoted with reference numeral 10. In FIG. 1, the "free space", i.e., the space that shall be evacuated, is essentially not visible and is basically the space that ultimately surrounds the inner high-barrier film 10 on the outside (the opposite, outer high-barrier film 60 is not shown in FIG. 1).

Figure 2:
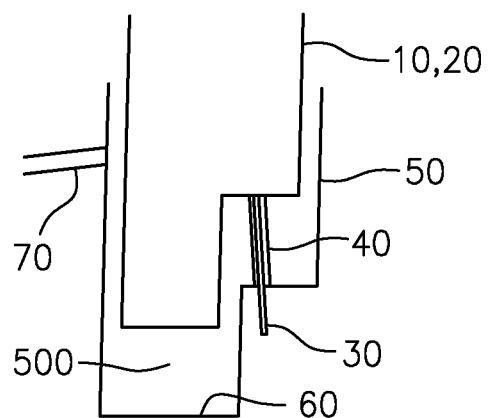
FIG. 2: shows a schematic view of a further part of the envelope of a vacuum insulation body with an outer container with an evacuation port.

In FIG. 2 a different, more advanced state is illustrated. The inner high-barrier film 10 is attached to the inner liner 20, and appear to be one and the same in this figure. In FIG. 2, the opposite, outside high-barrier film 60 is shown. The free space 500 to be evacuated is shown between inner and outer high-barrier films 10 and 60. The vacuum-tight envelope is constituted by high-barrier films 10 and 60 together.

The lead-through 40 extends through the free space 500 and both high-barrier films 10 and 60, and opens up to both sides of the vacuum body. The port 70 extends from the outside through the outer high-barrier film 60 and opens up into the free space 500 to be evacuated.

More particularly, FIG. 1 shows a high-barrier film with the reference numeral 10, which for the purpose of manufacturing a refrigerator and/or freezer is put over an inner container 20 of a refrigerator and/or freezer and thus apart from the open side of the inner container forms its outer envelope. The vacuum-tight high-barrier film 10 provides for generating a vacuum between the film 10 and the outer skin 50 of the appliance or its lining 60, which is schematically shown in FIG. 2.

Reference numeral 30 designates electric lines or conduits of the refrigeration system, i.e. of the refrigerant circuit of the refrigerator and/or freezer. These lines 30 extend from and to the inner container 20 or components arranged thereon or still to be arranged thereon in the course of the production process, such as e.g. interior lights, a temperature sensor, an evaporator, etc.

Reference numeral 40 designates the lead-through according to the invention. The same is fixed at the high-barrier film 10 in a vacuum-tight manner and, like the envelope 10, is composed of a vacuum-tight high-barrier film.

During the manufacturing process, this tubular lead-through 40 is vacuum-tightly connected first to the envelope 10 of the inner container 40 and later on to the lining 60 of the outer housing 50.

FIG. 2 shows the arrangement of the inner container 20 covered with the film 10 and the outer container 50 on whose inside a high-barrier film 60 is disposed as well. Apart from its open side, through which the inner container 20 is introduced, the outer container 50 thus is lined with a high-barrier film 60.

The vacuum insulation body thus comprises the inner container 20 with envelope 10 as well as the outer container 50 with lining 60. The envelope 10 and the lining 60 form the vacuum-tight envelope.

Reference numeral 70 designates an evacuation port, whose function will be explained in detail below.

The inner container 20 and/or the outer container 50 can be made of plastics, metal or of any other suitable material.

At this point it should be noted that the terms "inner container" and "outer container" are to be understood in a general sense and can represent structures open on one or also on several sides or also closed structures. Furthermore, it should be noted that the exemplary embodiment referring to a refrigerator and/or freezer also is applicable for all other vacuum insulation bodies.

The lead-through 40 also is vacuum-tightly connected with the lining 60 of the outer container 50. This design provides for evacuating the region 500 between the high-barrier films 10, 60 and in this way manufacturing the vacuum insulation body according to the invention. An entry of gas or air into this region is prevented by the vacuum-tight connections between the lead-through 40 and the film 10 as well as between the lead-through 40 and the film 60 and by the fact that the lead-through 40 itself likewise is made of a high-barrier film.

In the exemplary embodiment shown here a bulk material, for example a pearlite powder, is introduced into the region 500 between the envelope 10 of the inner container and the film 60 of the outer housing 50, subsequently the envelope 10 is closed with the lining 60 in a vacuum-tight manner, and finally an evacuation of the region 500 in which the bulk material is disposed is performed via the evacuation port 70. The evacuation port 70 thus is open towards said region 500, so that the generation of vacuum can be effected via the same.

The evacuation port 70 likewise is composed of a high-barrier film and is vacuum-tightly connected with the lining or high-barrier film 60 of the outer container 50.

The envelope 10 of the inner container 20 and the lining 60 of the outer housing 50 form the envelope according to the invention, which is penetrated by the lead-through 40 and to which the port 70 is connected as illustrated in FIG. 2.

Figure 3A:
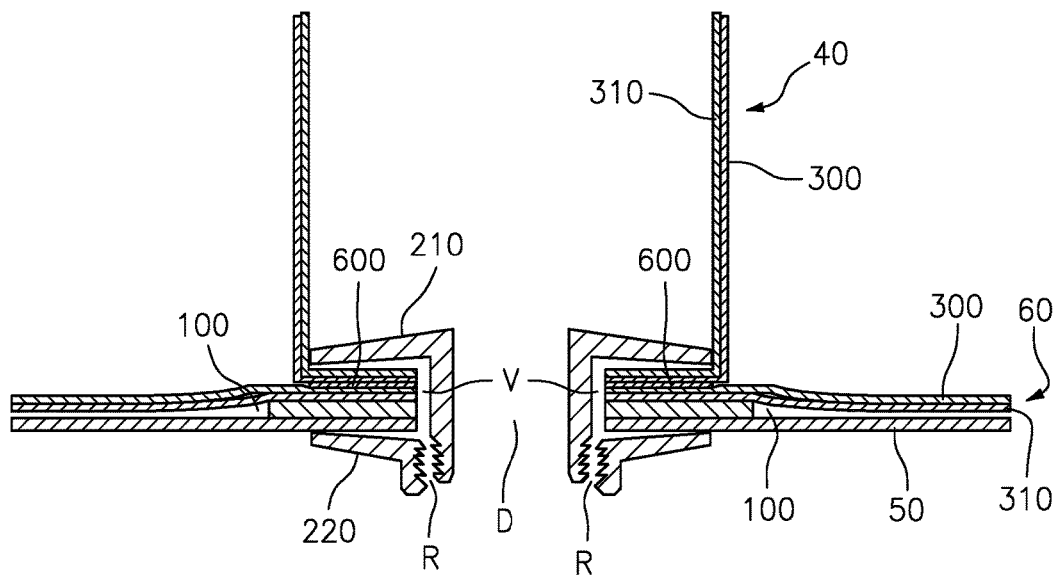
FIGS. 3a and 3b: show sectional representations through the connecting region between the envelope and the lead-through as well as between the envelope and the evacuation port.
Figure 3B:
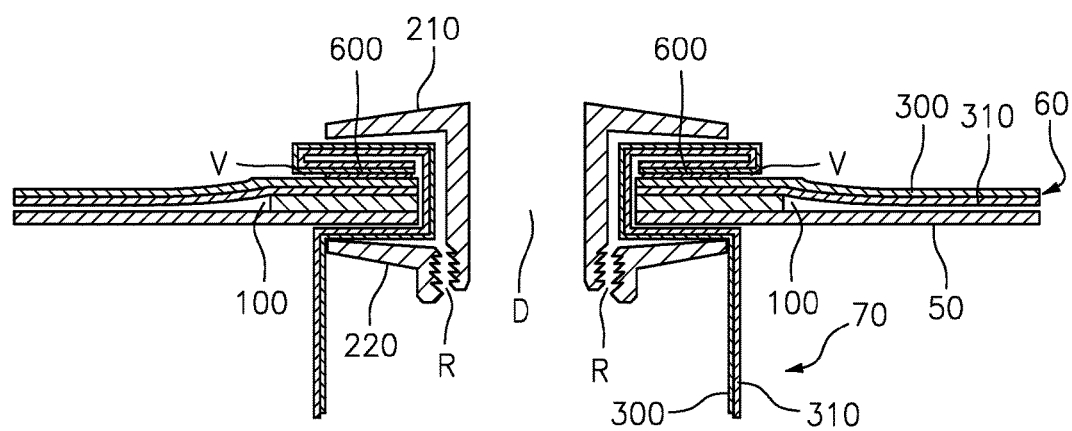

The fixation or vacuum-tight connection between the lead-through 40 and the envelope 10, 60 of the vacuum insulation body as well as the vacuum-tight connection between the port 70 and the lining 60 is effected by means of a clamp 200 as shown in FIGS. 3a and 3b. More particularly, FIG. 3a shows the connection of the lead-through 40 to the lining 60 of the outer container 50, which is identical to the connection of the lead-through 40 to the envelope 10 of the inner container 20. FIG. 3b shows the connection of the port 70 to the lining 60 of the outer container 50.

As can be seen in FIGS. 3a and 3b, the clamp consists of a first part 210 and a second part 220, which each include a circumferential jaw. The two jaws define a space between themselves, in which the individual films to be connected are arranged, which form the lead-through 40, the port 70, the envelope 10 and the lining 60.

By applying a pressing force between the jaws, i.e. by pressing the jaws together, a thermal sealing of the two films to be connected occurs, which in the exemplary embodiment shown here each consist of a polyethylene layer 300 and an aluminum layer 310 as barrier film. The region of the thermal sealing in FIG. 3 each is designated with the reference numeral V. The pressing force for example can be achieved by a screw connection which presses the jaws against each other.

The latching elements R on both parts 210 and 220 of the clamp serve the fixation of the position of the parts 210, 220 relative to each other.

The reference numeral 50 designates the envelope of the vacuum insulation body, such as for example sheet metal in the case of the outer shell 50 or also plastic material 20 in the case of the inner container.

The clamp 200 encompasses both this envelope 20, 50 and the two film portions to be connected with each other, so that in the case according to FIG. 3a, a vacuum-tight connection between the lead-through 40 and the film 60 of the envelope is achieved. The clamp 200 is guided through the aperture D in the outer skin 50.

The exemplary embodiment according to FIG. 3b shows the connection between the evacuation port 70 and the lining 60, wherein the film of the evacuation port 70 is guided through the aperture D of the envelope 50 and is tucked in on the inside of the envelope 50.

In this case, too, a vacuum-tight connection between the lining 60 and the port 70 is obtained by thermal sealing, so that by applying a negative pressure by means of the port 70 an evacuation of the region 500 between the films 10 and 60 of the vacuum insulation body can be achieved.

Reference numeral 100 designates a counterpressure mat whose function it is to form and to hold an abutment for the pressing force applied by the clamp. The counterpressure mat is located between the outer shell 50 and one of the films or between the inner container 20 and one of the films.

As can be seen in FIG. 3, the clamp reaches through an aperture D in the envelope 50 and in the inner container 20. After connecting the films, the clamp can be removed or also be removed as tension relief.

The clamp preferably is made of metal and particularly preferably of aluminum. Reference numeral 600 denotes a sealing compound. As pointed out previously, polyethylene and aluminum layers 300, 310 forming evacuation port 70 are folded over upon themselves within outer, high-barrier film 60 as shown in FIG. 3b.

The invention claimed is:

1. A refrigerator or freezer with at least one cooled interior space and at least one wall at least partly surrounding the cooled interior space, which partly or completely is formed by at least one vacuum insulation body with at least one vacuum-tight envelope, wherein
    at least one lead-through extends through the region surrounded by the envelope, which surrounds a free space, and at least one evacuation port extends from the envelope,
    the lead-through and the port are each formed vacuum-tight and vacuum-tightly connected with the envelope,
    the lead-through and the port partly or completely are each made of a high-barrier film, and
    the vacuum-tight connections between the lead-through and the port and the envelope are each a thermal sealing or an adhesive connection and comprise a clamp arranged to clamp and hold the envelope, lead-through or port and an outer container together.

2. The vacuum insulation body according to claim 1, wherein the clamp (210, 220) is arranged to fix the vacuum-tight connection and exert force on the envelope (10) and on the lead-through (40).

3. The vacuum insulation body according to claim 1, wherein said clamp (210, 220) comprises first and second parts (210, 220) each in the shape of a circumferential jaw situated within an aperture (D) through the vacuum insulation body.

4. The vacuum insulation body according to claim 3, wherein an inner circumference of the clamp (210, 220) forms an inner wall of the aperture (D).

5. The vacuum insulation body according to claim 1, wherein the clamp (210, 220) is located outside of and longitudinally surrounds the vacuum-tight connection from internal and external sides of the insulation body.

6. The vacuum insulating body according to claim 5, additionally comprising
    a polyethylene layer (300) and an aluminum layer (310) thermally-sealed (V) together,
    with the clamp (210, 220) longitudinally-extending around and clamping the polyethylene and aluminum layers (300, 310).

7. The vacuum insulating body according to claim 5, additionally comprising a latch (R) holding parts (210, 220) of the clamp (201, 220) together.

8. The vacuum insulating body according to claim 5, wherein a film forming said lead-through (40) terminates between a part (210) of said clamp (210, 220) and the outer container (50).

9. The vacuum insulating body according to claim 5, wherein a film forming said port (70) is guided from outside of the outer container (50) to inside of the outer container (50) circumferentially around said clamp (210, 220) and overlaps upon itself.

10. The vacuum insulation body according to claim 1, comprising
    an inner container (20),
    a vacuum-tight high barrier film (10) on one side of the inner container (20),
    the outer container (50) comprising a lining (60), and
    with a vacuum generated between the film (10) and lining (60).

11. The vacuum insulation body according to claim 10, additionally comprising
    a counterpressure mat (100) arranged to form and hold an abutment for the pressing force applied by the clamp (210, 220) and located between the outer container (50) and the lining (60) or between the envelope (10) and the inner container (20).

\* \* \* \* \*